United States Patent [19]

Legris

[11] 4,399,976

[45] Aug. 23, 1983

[54] VALVES WITH LENTICULAR OR SPHERICAL CLOSING MEMBER

[75] Inventor: André Legris, Saint-Maur, France

[73] Assignee: Legris SA, Rennes, France

[21] Appl. No.: 216,705

[22] Filed: Dec. 15, 1980

[30] Foreign Application Priority Data

Jan. 3, 1980 [FR] France ............................... 80 00075

[51] Int. Cl.³ .............................................. F16K 5/06
[52] U.S. Cl. .................................... 251/306; 251/315; 251/DIG. 1
[58] Field of Search ............... 251/172, 173, 306, 315, 251/DIG. 1

[56] References Cited

U.S. PATENT DOCUMENTS

| | | | |
|---|---|---|---|
| 2,676,782 | 4/1954 | Bostock et al. | 251/DIG. 1 |
| 3,394,914 | 7/1968 | Nagasato | 251/173 |
| 3,522,930 | 8/1970 | Richards et al. | 251/315 |
| 3,937,441 | 2/1976 | Baumann | 251/315 |
| 4,172,584 | 10/1979 | Legris | 251/315 |
| 4,226,258 | 10/1980 | Nakanishi | 251/172 |

FOREIGN PATENT DOCUMENTS

| | | | |
|---|---|---|---|
| 2131643 | 1/1973 | Fed. Rep. of Germany | 251/172 |
| 1247010 | 10/1960 | France | 251/173 |
| 2334901 | 7/1977 | France . | |
| 2033054 | 5/1980 | United Kingdom | 251/173 |

Primary Examiner—Martin P. Schwadron
Assistant Examiner—J. R. Shay
Attorney, Agent, or Firm—Pollock, Vande Sande & Priddy

[57] ABSTRACT

The invention relates to an improvement to valves with lenticular or spherical closing member mounted for pivoting in a valve body with interposition of a circular tight seal.

Downstream of the closing member, the valve body is provided with a bore inside which is removably mounted an annular member against which rests the tight seal, and which has a spherical part adopting the corresponding shape of the closing member, the said annular member comprising vent-holes.

The invention finds a useful application in the production of valves.

13 Claims, 22 Drawing Figures

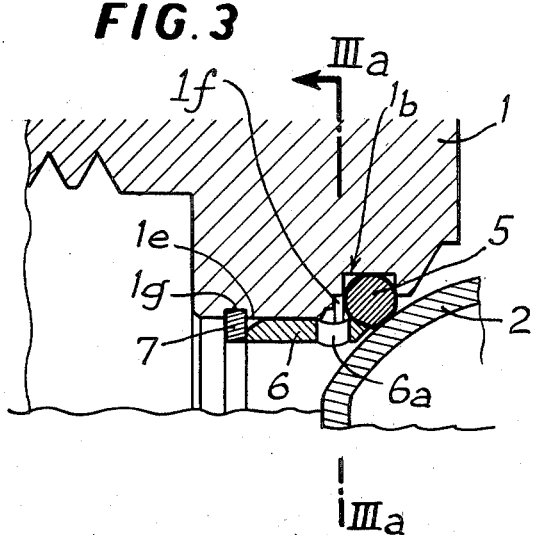
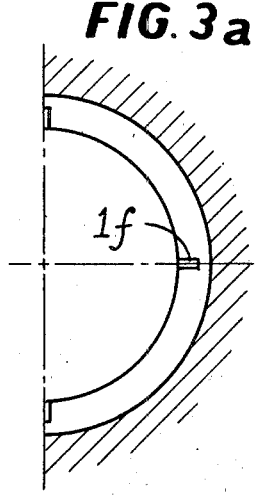
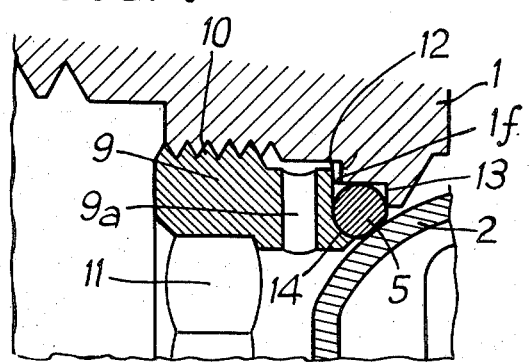
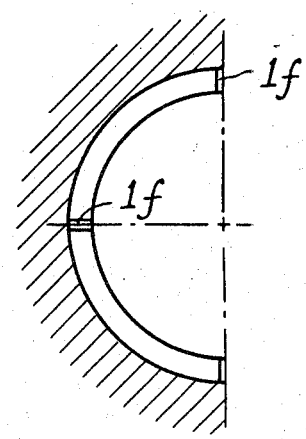
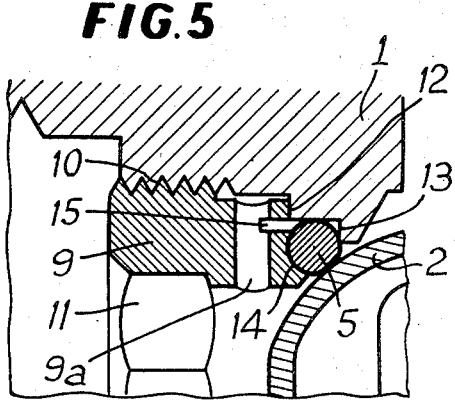
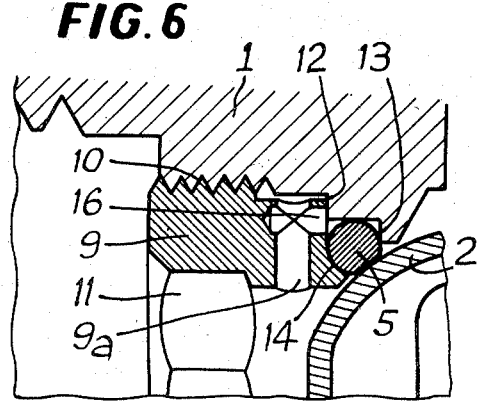

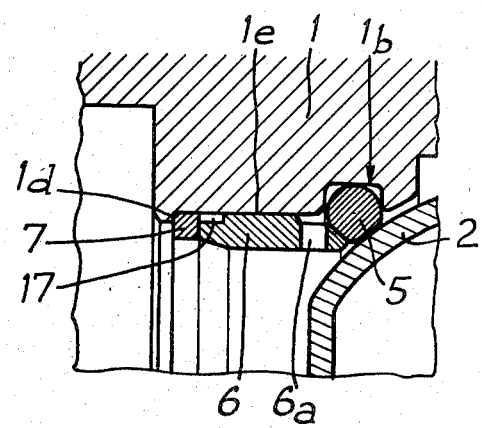
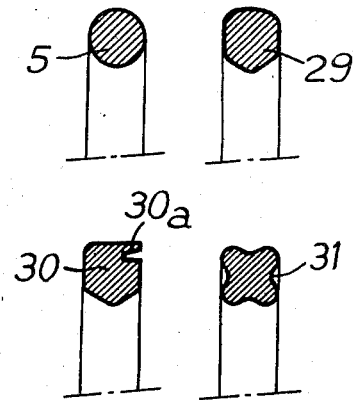
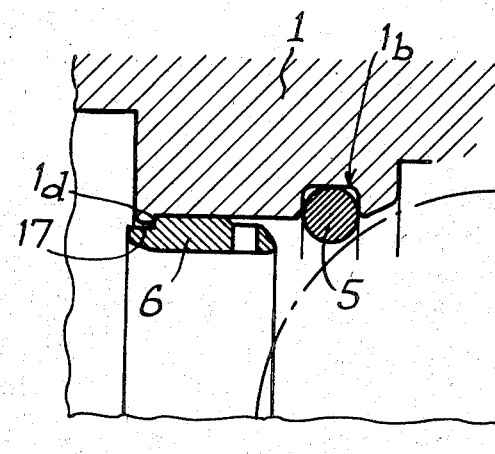
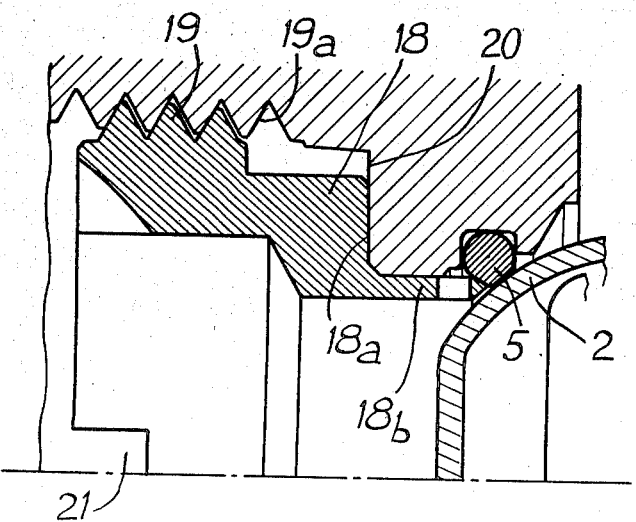

VALVES WITH LENTICULAR OR SPHERICAL CLOSING MEMBER

The present invention relates to valves with lenticular or spherical closing member.

The object of the improvement according to the invention is to obtain the decompression and disconnection of a flexible circular seat joint in valves comprising a closing component shaped as a segment of sphere or as a whole sphere, for controlling the flow of a fluid in water, air, oil, petrol, fuel, combustible gas pipe systems, etc.

With the already existing devices, it is necessary in order to disconnect the flexible tight seal, to systematically disconnect the whole closing assembly, and the decompression often requires the use of complicated parts or machining operations. The major disadvantage with these devices is the possible risk of inaccurate re-fitting of the closing member after replacement of the tight seal, if this operation is carried out by an unskilled person, and to obtain as a result a defective valve. The same disadvantage is met with the decompression members of the tight seal.

Such devices do not really satisfy the requirements and their reliability is very doubtful. The object of the improvement according to the invention is precisely to overcome these disadvantages, by proposing a valve whose body is provided, downstream of the closing member, with a bore inside which is removably mounted an annular element against which rests the tight seal and which presents a spherical part adopting the corresponding shape of the closing member, the said annular member comprising vent-holes adapted to create a communication between the conduit downstream of the tight seal and a housing inside which the said seal is engaged, and this with an instantaneous balancing of the pressures, the said annular member being joined to the body via a means situated on the side opposite the tight seal. This particular arrangement permits with only one member to ensure the following functions:

(1) To hold the tight seal in its annular housing.
(2) To decompress the housing of the seal when opening the valve.
(3) The instant and economical disconnection of the annular seal and its replacement without the parts inside the valve having to be removed.

The tight seal is held on its inner diameter by the annular member which ensures the complete immobilization of said seal inside the body and the partial closure of the annular groove.

The vent-holes provided on the annular member ensure an instant and efficient decompression of the fluid contained in the housing of the tight seal. Indeed, when the valve is opened, a considerable drop in pressure occurs inside the conduit during the filling of the downstream circuit and the high pressure subsisting behind the tight seal inside the housing acts forcefully thereon, ejecting it from the said housing. It is therefore highly important to achieve a perfect decompression by using connecting means of very large cross-sections.

For fitting-in and removing the tight seal, it suffices, after rotating the closing member by 90° or 180°, to release the annular member after disconnecting the locking member or after unscrewing the annular member, in order to accede to the tight seal and remove or replace it.

The invention will be more readily understood on reading the following description with reference to the accompanying drawings, in which:

FIG. 3 is a longitudinal cross-section of another embodiment of a part of the improved valve according to the invention;

FIG. 3a is a cross-sectional view along IIIa—IIIa of FIG. 3;

FIG. 4 is a longitudinal cross-section of part of the improved valve in which the annular member is screwed into the body;

FIG. 4a is a transverse cross-section showing the grooves of the annular member;

FIG. 5 is a longitudinal cross-section of another embodiment of the annular member screwed in the body;

FIG. 6 is a longitudinal cross-section of another embodiment of the annular member screwed in the body;

FIGS. 7 and 7a are longitudinal cross-sections of another embodiment of the annular member held by a locking ring;

FIG. 8 is a longitudinal cross-section of another embodiment of the screwed annular member with taper thread;

FIGS. 12 to 15 are cross-sectional views of tight seals of differently shaped cross-sections.

Figure 1:
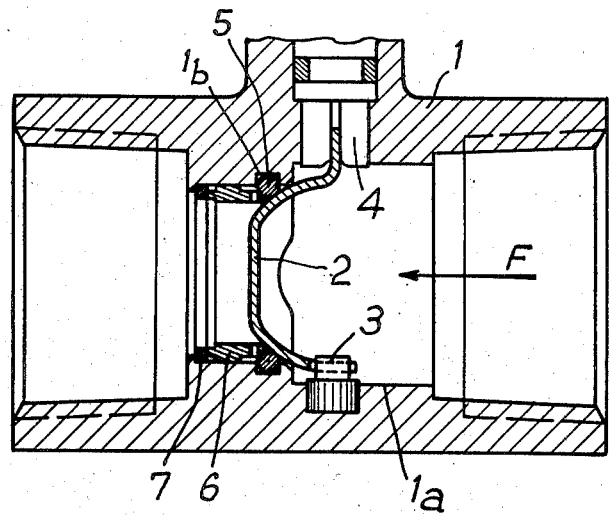
FIG. 1 is a longitudinal cross-section of a valve with lenticular closing member comprising the improvement according to the invention.

FIG. 1 shows a valve comprising a body 1 provided with a flow pipe 1a in which the fluid flows in the direction of arrow F and in which a closing member 2 of lenticular shape is mounted for rotation, said member being engaged, on one side on a stud 3 and on the other side, in a slit of a control rod 4 for driving it in rotation.

Figure 1A:
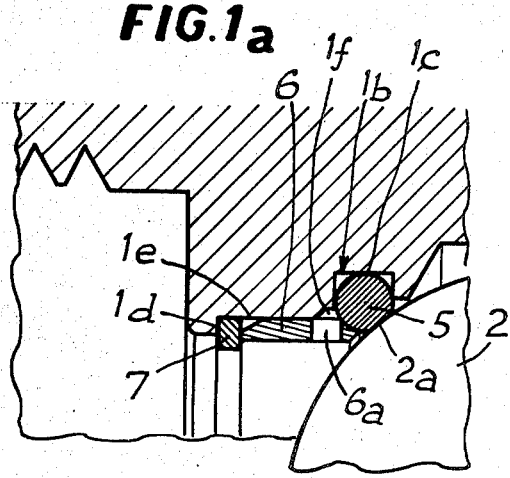
FIG. 1a is a cross-sectional view, on a larger scale, of an embodiment of the tight seal and of its holding and decompression means.

Downstream of the closing member 2, the body 1 is provided with a groove 1b (FIGS. 1 and 1a) containing a tight seal of the O-ring type, ensuring tightness, first on a circular contact zone 1c of the groove 1b, and second, on a spherical cap 2a of the closing member 2 when the latter is closed to the fluid flow with respect to the direction of flow along arrow F.

The seal 5 is held in position on its inner diameter by an annular member 6 mounted for sliding in a bore 1e downstream of the closing member 2, the said annular member being immobilized in a setback position by an elastic split ring 7 abutting against a shoulder 1d of the body 1.

Figure 1C:
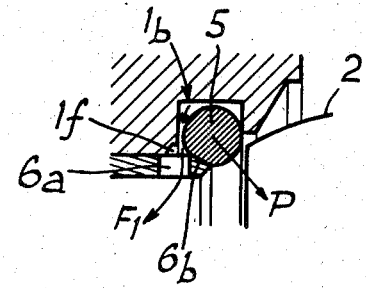
FIGS. 1b and 1c are cross-sectional views of the effect of the forces acting on the tight seal during decompression.
Figure 1B:
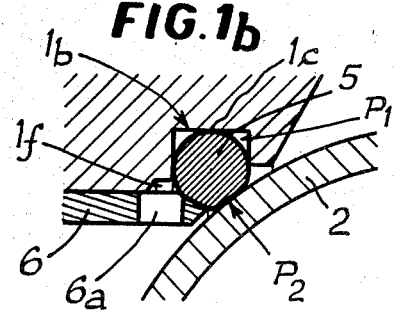

This particular arrangement of the different members inside the body 1 is meant to hold the tight seal 5 captive, by partly closing the annular groove 1b. In order to ensure the decompression of the seal 5, the annular member 6 is provided with vent-holes 6a situated radially, adjacent the seal 5, and communicating with the groove 1b via notches or recesses 1f provided in the valve body 1. When the closing member 2 is in the closure position, as shown in FIG. 1b, the pressure $P_1$ of the fluid is exerted inside the groove 1b upstream of the sealed zone 1c and the closing member 2 exercises on the seal 5 a pressure $P_2$ which keeps the latter in contact with the bottom of the groove 1b. When the closing member 2 is opened (FIG. 1c) the decompression of the seal 5 is achieved by the conjunction of the notches 1f, the vent-holes 6a and the groove 1b, the seal 5 being urged by the force P which tends to detach it from the bottom of the groove 1b, whereas the said seal is maintained by the end 6b of the annular member 6 and the edge of the groove 1b.

This particular arrangement permits to release the fluid kept inside the groove 1b on the opposite side of the sealing surface 2a of the seal 5, the said fluid flowing into the pipe 1a downstream of the closing member in the direction of arrow $F_1$. The seal 5 being held in position by the annular member 6 and not being subjected to any high pressures due to the release of the fluid from the groove 1b, the ejection of the seal from its housing is thus prevented.

Figure 2:
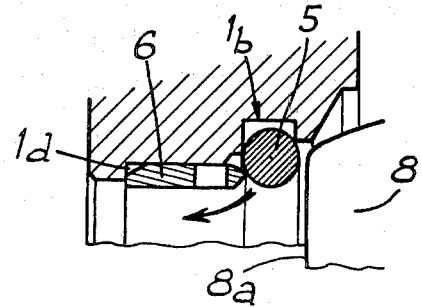
FIG. 2 is a cross-sectional view of the device showing the disconnection of the tight seal.

To replace the tight seal 5, after removing the valve from the pipe system, it suffices to withdraw the bushing 7 and to slide the annular member 6 against the shoulder 1d of the body 1 (FIG. 2).

The disconnecting conditions of the seal 5 are fulfilled when in the lenticular closing members or in closing members shaped as segments of sphere (FIG. 1), the said member has been caused to rotate by 180° or 90° with respect to the closing position, i.e. by half a turn.

Figure 10:
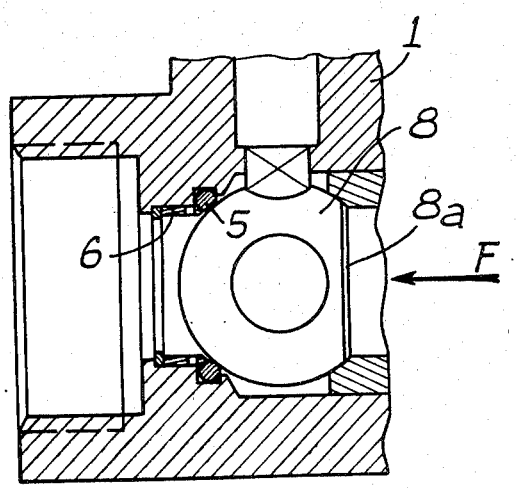
FIG. 10 is a cross-sectional view of an improved ball valve according to the invention.

On the contrary, with ball valves, having the total sphere closing members (FIG. 10) a flat 8a is provided which is sufficient to release the seal 5 entirely. Said flat 8a is situated at 180° with respect to the closure position, as this is shown in FIG. 10 where the closing member is closed, whereas in FIG. 2 the closing member 8 is in the position of removal of the seal 5, the flat 8a completely uncovering the seal 5.

The improved valves according to the invention are designed to allow the instant release of the lock notch device (by normally a quarter of a turn) so that the closing member can effect half a turn to come in the position of seal replacement.

These operations being completed it is very easy to remove the seal 5 and replace it with another as shown in FIG. 2.

For the valve to be brought back to a good working state, the new seal 5 should be placed in the groove 1b of the body, after which, the annular member 6 should be moved under the seal 5, the said member 6 being locked in order to prevent it from sliding backwards when the elastic ring 7 is being fitted.

In the embodiment shown in FIG. 3 the elastic ring 7 is engaged in a groove 1g of the body where it is immobilized. It is possible with this arrangement to have a bore 1e of constant diameter and to slide the annular member 6 over the whole length of said bore in order to remove it entirely therefrom, this making the seal 5 more accessible. FIGS. 3 and 3a show the notches 1f which create a link between the vent-holes 6a and the groove 1b. In the embodiments illustrated in FIGS. 4, 5 and 6 the elastic locking ring 7 has been removed and the annular member 9 supporting the tight seal 5 is provided on the outside with a threaded portion 10 by way of which it is screwed in a corresponding threaded part of the body 1.

The annular member 9 comprises on the inside a multi-sided orifice 11, which, with the help of a corresponding tool, permits the screwing-in and unscrewing of the annular member.

In the embodiments shown in FIGS. 4, 5 and 6, the annular member 9 is in abutment against a shoulder 12 of the body 1 after being screwed therein.

The housing inside which is placed the tight seal 5 is constituted by the combination of a shoulder 13 provided in the body 1 and by a shoulder 14 provided at one of the ends of the annular member 9.

In the embodiment shown in FIGS. 4, 4a connection between the vent-holes 9a and the housing of the seal 5 is ensured by means of notches 1f provided in the body 1, whereas in the embodiments shown in FIGS. 5 and 6 the connection between the vent-holes 9a and the housing of the seal 5 is ensured by means of slits 15 (FIG. 5) or of conduits 16 (FIG. 6). FIGS. 7, 7a show a variant of the embodiment of FIG. 1a in which the annular member 6 is held captive in the bore 1e of the body after the removal of the elastic ring 7. To allow a greater setback of the annular member 6, said latter is provided, at its end which is in contact with the ring 7, with a cut off part 17 of smaller cross-section, adapted to extend beyond the orifice of the bore 1e when the said annular member is in abutment against the shoulder 1d after the removal of the ring 7 as shown in FIG. 7a. FIG. 8 illustrates another embodiment of the annular member 18 which comprises a taper thread 19, engaged in a corresponding threading 19a provided on the body 1. The said annular member 18 further comprises a part, of large cross-section, with a radial surface 18a which abuts on a shoulder 20 of the body and a part of reduced cross-section 18b whose end is in contact with the seal 5.

To allow fitting in and removal, the annular member 18 is provided with a slit 21 into which can engage the bit of a screwdriver.

Figure 9:
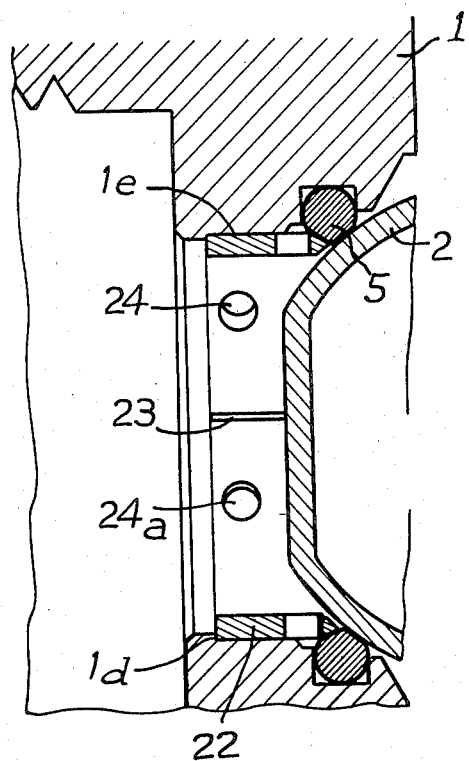
FIG. 9 is a longitudinal cross-section of an annular member constituted by an elastic split ring.
Figure 9A:
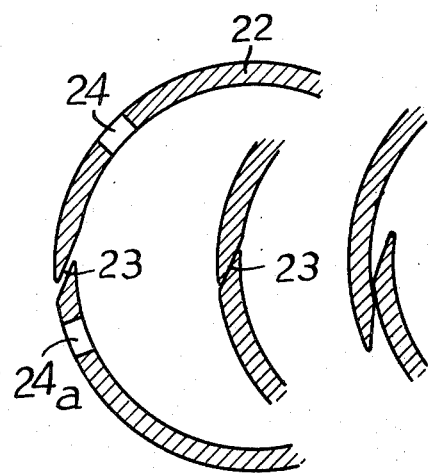
FIG. 9a is a view showing the different positions of the split ring for assembly and disconnection.
Figure 11:
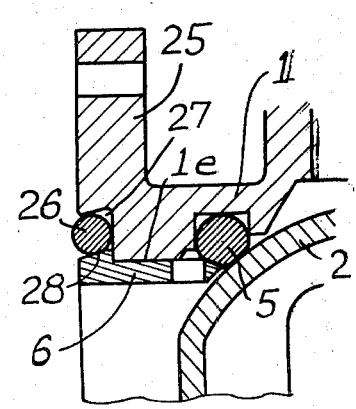
FIG. 11 is a longitudinal cross-section of an improved flanged valve according to the invention.

FIGS. 9 and 9a show another embodiment of the annular member which is constituted by a radially deformable ring 22 split in 23. In order to be engaged in the bore 1e of the body, the ring 22 is compressed as shown in FIG. 9a, so as to reduce its diameter, and the ring is thereafter released and left to elastically adopt its final position inside the bore 1e. The ring 22 is held in abutment against a shoulder 1d of the body. Said ring 22 is also provided with two holes 24 and 24a in which can be engaged the two parts of a tightening tool. In the embodiment shown in FIG. 11, the body 1 of the valve comprises assembling flanges 25 and the annular joint 26 of the flange which is situated in a recess 27 of the body is resting against a part 28 of reverse cone-shaped gradient provided at the end of the annular member 6 and extending on the outside of the bore 1e of the body. The joint 26 holds the annular member 6 in position when the valve is dismantled.

In the various embodiments of the valve given by way of example, the seal 5 has been shown as being of circular cross-section, i.e. of the O-ring type (FIG. 12), but it is equally possible to use joints 29 of polygonal or square cross-section as shown in FIG. 13. The joint 30 (FIG. 14) can also comprise a lip 30a or grooves 31 on its four faces as shown in FIG. 15.

The invention is not limited to the description given hereinabove but on the contrary covers any modifications that may be brought thereto without departing from the scope thereof.

What is claimed is:

1. An improvement in a valve having a circular seal and a closing member mounted for pivoting inside a valve body, said closing member comprising a spherical surface for sealing against said circular seal wherein said circular seal is located downstream of said closing member and presents a curved portion adopting the corresponding shape of the closing member, and said valve body is provided, downstream of the closing member and of said circular seal with a bore inside of which is removably mounted an annular element against which rests the circular seal, said annular member containing vent-holes adapted to create a communication between the conduit downstream of the circular seal and a housing inside which the said seal is engaged, for an instantaneous balancing of pressures, said annular member being joined to the body via means situated on the side opposite the circular seal.

2. The improvement of claim 1, wherein grooves are provided in the body at the back of the seal, which grooves create a communication between the housing provided in the body to receive the said seal and the vent-holes provided in the annular member.

3. The improvement of claim 1, wherein the means for joining the annular member with the body comprise an elastic split locking ring placed between a shoulder provided in the body and the end of the annular member opposite to the seal, the said annular member being held captive and being adapted to come in abutment by sliding against the shoulder after the removal of the ring.

4. The improvement of claim 1, wherein the means for locking the annular member with the body are constituted by an elastic split notched ring, removably placed in a groove provided in the body, and against which the said annular member abuts on the side opposite the seal.

5. The improvement of claim 3, wherein the captive annular member is provided with a cylindrical part sliding in a bore of the body and with a cut off part of smaller cross-section situated on the side of the locking ring and adapted to extend beyond the orifice of the bore when the said annular member is in abutment on the shoulder after the removal of the locking ring.

6. The improvement of claim 1, wherein the annular member is provided with a threaded part which is screwed in a corresponding threaded portion of the valve body, presenting a shoulder against which the annular member is in abutment, the said annular member comprising on the inside a multi-sided hole for tightening purposes.

7. The improvement of claim 1, wherein the housing inside which is placed the circular seal comprises the combination of a shoulder provided in the valve body and by a shoulder provided at one of the ends of the annular member.

8. The improvement of any one of claims 1, and 7 wherein the valve body includes conduits creating a communication between the vent holes in the annular member and the housing containing the circular seal.

9. The improvement of claim 6, wherein the annular member comprises a tapper thread by way of which it is screwed in a corresponding threaded part of the body, the said annular member having a part of large cross-section with a radial surface abutting against a shoulder of the body and a part of reduced cross-section whose end is in contact with the seal.

10. The improvement of claims 6 or 9, wherein the annular member is provided at one of its ends with a slit to allow the use of a screw-driver.

11. The improvement of claim 1, wherein the annular member is constituted by a radially deformable split ring, engaged elastically in a bore of the body having at one of its ends a shoulder against which abuts one of the ends of the annular member.

12. The improvement of claim 1, wherein the valve body comprises assembly flanges and wherein the annular joint of the flange which is placed inside a recess of the body is resting against a part of reverse conical gradient which is provided at the end of the annular member extending on the outside of the bore of the body, the said joint maintaining the annular member when the valve is dismantled.

13. The improvement of claim 1, wherein the circular seal is of circular, square, polygonal or lipped cross-section.

* * * * *